United States Patent Office 3,373,132
Patented Mar. 12, 1968

3,373,132
PROCESS FOR THE PRODUCTION OF ELASTO-
MERIC DIENE POLYMERS WITH IMPROVED
PROPERTIES
Hubert Sutter, Cologne-Flittard, Karl Nutzel and Kurt
Vohwinkel, Cologne-Stammheim, and Friederich Haas,
Cologne-Buchheim, Germany, assignors to Farben-
fabriken Bayer Aktiengesellschaft, Leverkusen, Ger-
many, a corporation of Germany
No Drawing. Filed Aug. 5, 1965, Ser. No. 477,587
Claims priority, application Germany, May 26, 1965,
F 46,163
3 Claims. (Cl. 260—33.6)

ABSTRACT OF THE DISCLOSURE

Vulcanizable oil-extended diene polymers are produced by treating diene polymers with sulfur chlorides and extending the treated polymers with extender oils.

One property of diene polymers and copolymers which is of particular interest economically and technically is their high fillability with carbon black and oil. Even with a high filling of carbon black and oil, there are still obtained very good mechanical properties of the vulcanizates and also a considerable improvement in the coefficient of friction, which is of great advantage with respect to tread surface qualities of automobile tires.

The blending with oil can be effected in various ways. The incorporation of the oil by mixing on a roller or in an internal mixer seems at first sight to be the simplest procedure. However, it presents certain difficulties, particularly with large quantities of oil, since a poor carbon black and oil distribution must be expected, even with a relatively long mixing time. On the other hand, if a good distribution is required, relatively long mixing times are necessary. Moreover, the green strength (tensile strength of the crude mixture) and the cold flow are very unfavorable with a high oil filling or loading, and this can lead to difficulties with the handling of the crude mixture, more especially when using the automatic transport arrangements which are usual at the present time.

It has been found from experience to be simpler to mix the oil with the elastomer solution, such as that obtained with solution polymerization of for example 1,3-butadiene in inert hydrocarbons such as benzene, toluene, hexane, heptane, cyclohexane and others, since all extending oils under consideration are soluble in these solvents. After such an elastomer solution has been worked up (solvent driven off and dried), an oil blend is obtained in which there is the best possible oil distribution.

It is known that, in addition to the Mooney viscosity and the cold flow of the crude rubber being appreciably impaired by the blending with oil, the quality of vulcanizates obtained therefrom are unsatisfactory. In order at least partially to avoid this deterioration in quality, it is accordingly necessary to use a rubber component of higher viscosity, which can be obtained by altering the polymerization conditions.

Oil can also be incorporated into the solution of a polybutadiene of high molecular weight (ML–4'=90–120) by mixing and the solution can thereafter be worked up in known manner. With complex catalysts which contain titanium, it has been impossible to obtain on an industrial scale e.g. 1,4-cis-polybutadienes with a cold flow which is still sufficient for practical handling; in addition, it would no longer be possible for such a product to be processed. On the other hand, if the starting material has such a Mooney viscosity that the processing properties of the oil blend satisfy the normal requirements, the cold flow is so unfavorable that the product cannot be considered for use in practice. It is true that the conditions are somewhat more favorable when starting from a polybutadiene which has been produced with cobalt-containing catalysts, but here it is also necessary for reasons of technical processing to use a polybutadiene having a not too high Mooney viscosity, and this again leads to a comparatively unfavorable cold flow and a low green strength value.

Furthermore, in contrast to the elastomers which are produced in emulsion, considerable technical difficulties and economic disadvantages are involved in producing elastomers with a Mooney viscosity high enough for an oil blending by way of a solution polymerization process. If an attempt is made to increase the Mooney value in a solution with a given polymer concentration, the viscosity of this rubber solution rises exponentially with the Mooney value. For example, a 12% polybutadiene solution with a Mooney value ML4=20 has a viscosity of 2800 cp., and with a Mooney value ML4=100, it has a viscosity of 33,000 cp. This strong increase in the viscosity inhibits the necessary mixing of the contents of the polymerization vessel during the polymerization; the heat transfer to the cooling surfaces is reduced and the transport of the solution in the pipe conduits requires pumps which are greatly over dimensioned. The viscosity of high molecular weight types of rubber can be decreased if the solid content of the rubber in the solution is reduced; however, with a given residence time, this reduces the yield per unit of volume and time and strongly increases the quantity of solvent.

It is therefore an object of this invention to produce an oil blend from a diene homopolymer or copolymer treated with oxygen-free halides of sulfur. For this purpose, a solution-polymerized stereospecific diene of medium Mooney viscosity (ML–4=30–60) is treated for example in its solution with an oxygen-free sulfur halide, mixed with a rubber extending oil and worked up in a manner known per se. In this connection, the sequence of the addition of sulfur halide and extending oil is arbitrary.

Suitable diene polymers are more especially polybutadiene, and polyisoprene and their copolymers, in particular stereospecifically polymerized products.

This process is certainly not limited to the above polymers but may be used in treating butadiene-acrylonitrile copolymers, polychloroprenes, copolymers of butadiene and styrene and ethylene-propylene terpolymers (the third component being e.g. dicyclopentadiene, norbornadiene, cyclooctadiene and hexadiene-1,5).

Disulfur dichloride and sulfur dichloride are advantageously used as sulfur halides, disulfur dichloride being particularly favorable.

Surprising advantages are found when the polybutadiene-oil rubbers especially 1,4-cis-polybutadiene rubber produced according to the invention are compared with polybutadienes which are not oil-extended, for example, when they are used in automobile tread surface mixtures. As well as advantages in the processing behavior, a substantially improved vulcanizate quality is obtained by comparison with the normal polybutadiene, to which the corresponding oil quantity has been applied, the improvement being particularly found as regards the elastic properties and also the resistance to abrasion.

Furthermore, a more favorable processing behavior, a substantially better cold flow and also a better quality of vulcanizates is obtained than in the case of polybutadienes brought by polymerization to a high Mooney viscosity and thereafter extended with oil.

It is known that automobile tread surfaces of 1,4-cis-polybutadiene which is not extended with oil are characterized by a substantial improvement in the resistance to abrasion by comparison with natural rubber, but show a strong deterioration in the road-holding properties.

It is very surprising that by the use of oil-extended 1,4-cis-polybutadiene obtained according to the invention instead of the aforementioned standard 1,4-cis-polybutadiene in a tread surface quality composed of the same mixture, a substantial improvement in the abrasion resistance, and simultaneously a distinct improvement in the road-holding properties are obtained. This result was particularly surprising, because polybutadiene-styrene rubber which is produced by known processes and extended with oil is known to have a less favorable abrasion behavior than a similar butadiene-styrene rubber which is not oil-extended.

The polydiene-oil blends according to the invention can be produced in various ways and this is explained by reference to the example of polybutadiene. First of all, 11–16 parts of butadiene, dissolved in 100 parts of inert hydrocarbon, e.g. benzene or toluene, are polymerized in a manner known per se with exclusion of air and moisture, using organoaluminium compounds, iodine compounds and titanium compounds, e.g. aluminium triisobutyl, iodine and titanium tetrachloride, or with halogenous organoaluminium compounds and cobalt catalysts, e.g. aluminium sesquichloride and cobalt naphthenate, to give polybutadiene with more than 90% of 1,4-cis-bond fractions. Polybutadienes with lower 1,4-cis-bond fractions (about 40%) but high 1,4-trans-bond fractions, which can be obtained utilising lithium catalysts, can also be used. The polymerization is controlled by varying the catalyst components, the quantity of the total catalyst or the temperature, or by modifiers, so that the viscosity of the isolated polybutadiene is adjusted to a Mooney value between 20 and 60, advantageously between 30 and 50. 0.01 part to 1.5 parts by weight, advantageously 0.1 to 0.8 part by weight, of one of the inorganic oxygen-free sulfur chloride, e.g. $S_2Cl_2$ or $SCl_2$ are added to the finally polymerized solution per 100 parts of polybutadiene. Since these sulfur halides react quite quickly with the dissolved polymer, it is advantageous to dilute the sulfur halides, and as diluents, it is possible to choose the hydrocarbon in which the polybutadiene was prepared. A thorough mixing is necessary for the reaction, while the addition time can be varied within wide limits. The viscosity increases during the addition. After 5 minutes, there are added 10 to 100 parts and advantageously 20 to 60 parts, per 100 parts of polybutadiene, of one of the usual plasticizer oils. Naphthene and paraffin oils can be used, but highly aromatic oils are preferred. Vegetable oils, such as linseed oil and soya bean oil can also be used. 0.1 to 1 part, based on 100 parts of polybutadiene, of an age resister is introduced before, during or after the addition of the oil. The age resister can be a non-discoloring phenolic stabilizer, e.g. 2,6-di-tert.butyl-p-cresol or 3,3'-dimethyl-5,5'-di-tert.-butyl-6,6'-dihydroxydiphenyl methane, but it is also possible to use a discoloring stabilizer, which is usually of amine character, for example a p-phenylenediamine.

In the process according to the invention, the sulfur halides can also act as deactivators for the polymerization catalyst. In this case proton-active compounds may be added afterwards. However, if the catalyst is deactivated as usual with equivalent quantities of proton-active compounds, such as alcohols, carboxylic acids or phenols, before the addition of the sulfur compounds, less sulfur halides are required in order to reach the same Mooney values.

The following further variations of the process can be chosen, depending on the polymerization conditions and technical data: The stopped diene polymer solution provided with stabilizer can be treated with $S_2Cl_2$ and thereafter mixed with oil; finally, the calculated quantity of oil can initially be present in the stopped polydiene solution provided with stabilizer and thereafter the sulfur halide solution can be admixed.

The quantity of the oil is so measured that the Mooney viscosities ML-4 of the oil blends are between 25 and 65 and advantageously between 30 and 45; in this range, not only are the mechanical values of the vulcanizates excellent, but also the workability on the roller and in an internal mixer, as well as the spraying capacity, are at their best. The removal of the solvent, which can be effected by precipitation of the polymer solution in lower alcohols such as methanol, ethanol and isopropyl alcohol (but is advantageously achieved by being driven off with steam) does not differ from the process which is used with unblended polybutadiene. The precipitated polybutadiene-oil blends can be dried in vacuum chambers, circulating air furnaces or drying worms. This procedure also does not differ from that used with unblended polybutadienes.

As regards industrial use, the diene polymer-oil rubbers produced by the process according to the invention have the great advantage that they have a very low cold flow, despite the large quantities of oil contained therein, and this cold flow value is even better than that of most 1,4-cis-polybutadiene solid rubbers obtainable commercially. Consequently, the diene polymer-oil rubbers produced in this way can be handled in excellent manner during transport, storage and processing, even with relatively high external temperatures.

The higher green strength of the products according to the invention is advantageous during the processing. The preparation of mixtures and the further processing thereof is greately facilitated by comparison with the usual dienes, polymers and copolymers, since the product takes up the shearing stresses in rolling and kneading mechanisms and does not yield it but withstands the tensile stresses being set up as it is transported on the belt. On the other hand, the processing procedure is not only shortened by the well-distributed quantity of oil already present in the rubber, but leads at the same time to a substantially improved distribution of the oil and the other constituents of the mixture, more especially carbon black and other fillers. As a result, the workability on rolling mills and in internal mixers is greatly facilitated.

Having regard to the formation of the mixture, the polydiene-oil rubbers of the invention permit the introduction of higher proportions of carbon black and oil (70–100 and 30–60 parts) respectively, than the normal polydienes produced solely by polymerization.

An important saving in cost is thus obtained with the preparation of the mixture without appreciably changing the properties of the vulcanizate.

Finally, as regards the properties of the vulcanizates, the 1,4-cis-polybutadiene-oil rubbers obtained according to the invention with the same mixing structure, for example, in a quality suitable for automobile tread surfaces (70 parts of carbon black and 42 parts of oil) are clearly superior to the normal polybutadienes produced by polymerization. In this connection, particular advantages are obtained as regards the tensile strength and structural strength, the stress values (modulus at 300% and 500% elongation), the elasticity and more especially the resistance to abrasion.

The following examples are intended to prove and more fully to explain the technical advance which is produced; the essential improvement in the mechanical values of the polybutadiene-oil blends according to the invention can be seen from the examples of use.

The butadiene polymerization reactions in the examples indicated were carried out under the usual conditions of stereospecific polymerization with iodine-containing organometallic mixed catalysts in toluene, and the isoprene polymerization reactions were carried out in heptane and with lithium butyl as catalyst. The catalyst system was so chosen in both cases that as unfavorable a cold flow as possible was obtained, in order more clearly to set forth the effects.

In the following examples, the cold flow is indicated in milligrams per minute (mg./min.). It was determined by means of a modified discharge plastometer at 50° C. This method is most highly adapted to practical conditions. The cold flow of the normal commercial polybutadienes, determined by this method, fluctuates between 5 and 30 mg./min., depending on the product.

The parts indicated in the following examples are parts by weight, unless otherwise mentioned.

EXAMPLE A FOR THE PRODUCTION OF 1,4-CIS-POLYBUTADIENE 100 parts of 1,3-butadiene were dissolved in 900 parts of dry toluene in a dry stirrer-type vessel covered with nitrogen and provided with external cooling. The solution cooled to −5° C. had added thereto, while stirring, 0.491 part of aluminium triisobutyl (25% solution in toluene), thereafter 0.157 part of iodine (0.5% solution in toluene) and 0.059 part of titanium tetrachloride (3% solution in toluene). The polymerization of the butadiene started immediately and was so conducted that the temperature did not rise above 25° C. After 3 hours the conversion was 95% and after another hour it was 96%. The Mooney viscosity was ML–4=48.

EXAMPLE B FOR THE PRODUCTION OF POLYISOPRENE 100 parts of dry isoprene were dissolved in 900 parts of dry hexane in the apparatus described in Example A. To the solution cooled to 15° C. there were added with stirring 1.58 parts of aluminum triisobutyl (25% solution in hexane) and 1.52 parts of titanium tetrachloride (10% solution in hexane). The copolymerization of isoprene started immediately and was kept at a temperature of 20 to 25° C. After 6 hours the conversion was 87%. The Mooney viscosity of the polyisoprene was

ML–4=47

EXAMPLE C FOR THE PRODUCTION OF ETHYLENE-PROPYLENE TERPOLYMER

In a dry stirrer-type autoclave rinsed with nitrogen 150 g. of dicyclopentadiene were dissolved in 45 kg. of dry hexane. A nitrogen pressure of 1.4 atmospheres was established in the autoclave. 4 kg. of propylene and 0.4 kg. of ethylene were introduced under pressure. As catalyst 123 g. of ethylene-aluminum sesquichloride (20% in hexane) and 8.5 g. of vanadium oxychloride (5% in hexane) were added in measured quantities. The polymerization started immediately. An ethylene-propylene mixture (molecular ratio 1:1) was introduced during polymerization at such a rate that a pressure between 1.8 and 3.2 atmospheres was maintained. The reaction temperature was kept between 25 and 35° C. After 30 minutes half the amount each of the initially added quantities of catalyst was added in measured quantities. After a further 30 minutes the addition of the ethylene-propylene mixture was stopped. The yield of rubber was 2.6 kg. The amorphous product contained 40% ethylene units, 54% propylene units and 6% dicyclopentadiene units. The Mooney-value was ML–4=49.

EXAMPLE D FOR THE PRODUCTION OF A BUTADIENE-STYRENE BLOCK POLYMER

In the apparatus described in Example A 75 parts of dry butadiene and 25 parts of dry styrene were dissolved in 735 parts of dry toluene. 0.110 part of lithium-n-butyl (0.5 normal solution in toluene) was added with stirring in measured quantities to the solution heated to 45° C. The polymerization started immediately and was kept at 50° C. After 1½ hours the reaction temperature was raised to 65° C. After totally 3 hours the polymerization was stopped at a conversion of 98%. The proudct had a Mooney-value of ML–4=44 and a polystyrene-content of 23.4% which was determined by decomposition by oxidation.

Example 1

A part of the polybutadiene solution A was conveyed in the absence of air and moisture into a dry stirrer-type vessel covered with nitrogen, the said vessel being equipped with an effective external circulation. With simultaneous stirring and circulation of the solution, 0.55 part (based on 100 parts of polybutadiene) of disulfur dichloride ($S_2Cl_2$) in the form of a solution in dry toluene (30 g. of $S_2Cl_2$/l.) were introduced into the circulation within 10 minutes. After the addition, stirring was continued for 30 minutes with simultaneous rotation.

During this time, samples were taken after 5, 10 and 30 minutes in order to establish the Mooney value.

| Minutes: | ML–4 |
|---|---|
| 5 | 90 |
| 10 | 89 |
| 30 | 90 |

Thereafter, 37.5 parts of a highly aromatic mineral oil and 0.5 part of 2,2′-methylene-bis-(4-methyl-6-tert.-butylphenol) (both related to 100 parts of polybutadiene) were mixed in.

The solution was worked up by driving off the solvent in known manner by means of steam, and the oil blend was dried. The Mooney value was ML–4=40.

Example 2

As described in Example 1 0.6 part (based on 100 parts of polybutadiene) of sulphur dichloride ($SCl_2$), in the form of a solution in dry toluene (30 g./l.) is added to part of the polybutadiene solution A. After stirring for another 10 minutes, 37.5 parts of a highly aromatic mineral oil and 0.5 part of 2,2′-methylene-bis-(4-methyl-6-tert.-butylphenol) (both related to 100 parts of polybutadiene) were admixed therewith. Working up took place as in Example 1. The Mooney value was ML–4=45.

Example 3

A part of the polybutadiene solution A was stopped with 1% of disproportionated resinic acid and 0.5% of 2,2′-methylene-bis-(4-methyl-6-tert.-butylphenol), both related to polybutadiene. This solution was aftertreated, as described in Example 1 with 0.5% (based on polybutadiene) of disulfur dichloride. After 10 minutes, 37.5 parts of a highly aromatic oil were admixed. The solution was worked up as in Example 1. The Mooney value was ML–4=40.

Example 4

A part of the polybutadiene solution A was stopped with 1% of disproportionated resinic acid and 0.5% of 2,2′-methylene-bis-(4-methyl-6-tert.-butylphenol) (both related to polybutadiene) and stabilized. Using the apparatus described in Example 1, this solution was first of all mixed with 37.5% (based on polybutadiene) of highly aromatic oil and then, as described in Example 1, with 0.5% (based on polybutadiene) of disulfur dichloride. After stirring for another 10 minutes, the solution was worked up as described in Example 1. The Mooney value was ML–4=40.

Example 5

The polybutadiene solution obtained according to the production Example C was aftertreated, as described in Example 1, with 0.5% (based on polybutadiene) of disulfur dichloride, stirred for another 10 minutes and then mixed with 37.5% of a highly aromatic oil and 0.5% of 2,2′-methylene-bis-(4-methyl-6-tert.-butylphenol), both related to polybutadiene. Working up was effected as described in Example 1. The Mooney value was ML–4=43.

Example 6 (*comparison example*)

The polybutadiene solution obtained according to production Example B was stopped and stabilized with 1% of disproportionated resinic acid and 0.5% of 2,2′-methylene-bis-(4-methyl-6-tert.-butylphenol), and then blended with 37.5% of a highly aromatic oil, all quantities being related to polybutadiene. Working up was effected as described in Example 1. The Mooney value was ML-4=21.

Example 7

The polyisoprene solution obtained according to Example D was stopped and stabilized with 0.3% methanol and 0.5 2,2'-methylene-bis-(4-methyl-6-tert.-butylphenol) (both related to polyisoprene). By degasing in vacuum the residual monomer was substantially removed. The polymer solution was then blended with 37.5% of a highly aromatic mineral oil, treated with 0.4% disulphuric dichloride and stirred for a further 10 minutes. Working up is effected as described in Example 1. The Mooney-value was ML-4=39.

Example 8

The polymer solution obtained according to Example C was stopped and stabilized with 50 g. of methanol and 13 g. of 2,2'-methylene-bis-(4-methyl-6-tert.-butylphenol) and then liberated in vacuum from the unreacted monomer. The solution was subsequently blended with 1.3 kg. of a naphthenic mineral oil. For aftertreatment 5.2 g. of disulfuric dichloride dissolved in 100 ml of dry hexane were introduced in measured quantities with stirring within 5 minutes. After stirring for 10 minutes the solution was worked up as described in Example 1. The Mooney-value was ML-4=35.

to production Example A are reproduced, into which 41.5 parts of an aromatic oil per 100 parts of rubber have been incorporated by rolling during the production of the mixture. This example is used for comparison purposes.

In Example II, the recipe and the mechanical values of the vulcanizate of a polybutadiene-oil blend, produced according to Example 9, are reproduced.

In Example III concerning the application, the specification and the mechanical values of the vulcanizates of a polybutadiene obtained according to Example 6 are reproduced.

In Example IV concerning the application, the recipe and the mechanical values of the vulcanizates of a polybutadiene according to production Example A are reproduced. During the production of the mixture, 5 parts of an aromatic oil and 50 parts of ISAF carbon black were incorporated by rolling, per 100 parts of rubber. This example serves for comparison with Example V.

In Example V concerning the application, the recipe and the mechanical values of the vulcanizates of a polybutadiene obtained according to Example 3 are reproduced. During the production of the mixture, 55 parts of ISAF carbon black were incorporated by mixing to 100 parts of this oil extended polybutadiene.

The mechanical values of the vulcanizates of the polybutadienes according to Examples 3 to 5 correspond to those of the Example III, pre-supposing the same recipes and Mooney viscosities.

|  | Examples of application | | | | |
|---|---|---|---|---|---|
|  | I | II | III | IV | V |
| Polybutadiene-solid rubber | 100 |  |  | 100 |  |
| Oil-extended polybutadiene, Example 9 |  | 137.5 |  |  |  |
| Oil-extended polybutadiene, Example 6 |  |  | 137.5 |  | 100 |
| Aromatic mineral oil | 41.5 | 4.0 | 4.0 | 5 |  |
| Zinc oxide | 5.0 | 5.0 | 5.0 | 5.0 | 5.0 |
| Disproportionated abietic acid | 4.0 | 4.0 | 4.0 | 4.0 | 4.0 |
| ISAF carbon black | 70.0 | 70.0 | 70.0 | 50.0 | 555 |
| Stearic acid | 2.0 | 2.0 | 2.0 | 2.0 | 2.0 |
| Paraffin | 0.6 | 0.6 | 0.6 | 0.6 | 0.6 |
| N-phenyl-N'-isopropyl-p-phenylene diamine | 1.0 | 1.0 | 1.0 | 1.0 | 1.0 |
| Phenyl α naphthylamine | 1.0 | 1.0 | 1.0 | 1.0 | 1.0 |
| Benzthiazyl-2-sulphene-morpholide | 1.5 | 1.5 | 1.5 | 1.5 | 1.5 |
| Sulfur | 2.0 | 2.0 | 2.0 | 2.0 | 2.0 |
| Mooney viscosity ML-4 | [1] 45 | 25 | 40 | 48 | 40 |
| Defo hardness and elasticity | [1] 500/27 | 250/15 | 525/33 | 550/40 | 475/33 |
| Cold flow (mg./min.) | [1] 10 | 35 | 3.4 | 16.4 | 4.2 |
| Mixture Defo | 800/13 | 1,000/15 | 1,500/30 | 1,050/12 | 1,375/31 |
| Mooney viscosity of the crude mixture (100°) | 42 | 50 | 70 | 58 | 72 |
| Green strength (g./cm.²) | 100 | 120 | 350 | 95 | 340 |
| Tensile strength, kg./cm.² | 125 | 130 | 160 | 145 | 140 |
| Elongation at break (percent) | 570 | 550 | 500 | 545 | 510 |
| Modulus (300/500%) | 45/100 | 50/110 | 75/160 | 55/125 | 55/115 |
| Ring structure (kg./4 mm.) | 19 | 19 | 20 | 18 | 19 |
| Hardness, 20/75° | 57/54 | 57/54 | 61/59 | 63/58 | 5/56 |
| Rebound elasticity, 20/75° | 37/42 | 39/44 | 44/50 | 37/40 | 35/37 |
| Emery sharpness 40 DIN abrasion (MM.³) | 62 | 58 | 45 | 49 | 36 |
| Steaming at 70° C. after 10 min. (percent) | 28 | 27 | 22 | 26 | 27 |
| ΔT (° C.) in the Goodrich flexometer at 100° after 25 min | 18 | 16 | 12 | 19.1 | 21.6 |
| Frictional coefficient ² |  |  |  | 0.60 | 0.71 |

[1] These data are related to the material which is not oil-extended.
[2] Frictional force established under rolling stress at 141 r.p.m., 0.5 kg. load, at 20° C. and 60% slip.
Optimum vulcanization: 30' at 151° C.

Example 9

The polymer solution obtained according to Example D was stopped and stabilized with 1% stearic acid and 0.5% 2,2' - methylene-bis-(4-methyl-6-tert.-butylphenol) (both related to the copolymer) and then blended with 37.5% of a highly aromatic mineral oil. The solution was subsequently aftertreated with 0.4% $S_2Cl_2$ as described in Example 1 and stirred for a further 10 minutes. Working up was effected as described in Example 1. The Mooney-value was ML-4=37.

EXAMPLES FOR USING THE POLYMERS

In using Example I, the recipe and the mechanical values of the vulcanizates of a polybutadiene according The determination of the cold flow was affected in a discharge viscometer, the quantity in mg./min. being a measurement of the cold flow. A lowest possible cold flow is desirable. The tests of the other properties were carried out in accordance with the standard specifications set out below:

Defo hardness and elasticity _____ DIN 53,514
Mooney viscosity ML-4 _____ DIN 53,523

Tensile strength:
    Elongation at break _____ DIN 53,504
    Modulus _____ DIN 53,504
Hardness _____ DIN 53,505
Rebound elasticity _____ DIN 53,512
DIN abrasion _____ DIN 53,516
Steaming _____ DIN 53,513
ΔT in Goodrich flexometer _____ ASTM 0623-58

We claim:
1. A process for producing a vulcanizable oil-extended diene polymer which comprises reacting a diene polymer dissolved in an inert hydrocarbon solvent and having a Mooney plasticity of between 15 and 80 ML–4 with an oxygen-free sulfur chloride at a temperature between −30 and +200° C., mixing the resulting solution with a rubber-extending oil and recovering the oil-extended diene polymer from the solution.

2. The process of claim 1 wherein said diene polymer is 1,4-cis-polybutadiene.

3. A process for producing a vulcanizable oil-extended diene polymer which comprises reacting a mixture of (1) a solution of a diene polymer having a Mooney plasticity between 15 and 80 ML–4 dissolved in an inert hydrocarbon solvent, and (2) a rubber-extending oil, with an oxygen-free sulfur chloride at a temperature of −30 to +200° C. and recovering the oil-extended diene polymer from the solution.

References Cited
UNITED STATES PATENTS

| | | | |
|---|---|---|---|
| 2,291,404 | 7/1942 | Morway | 260—139 |
| 2,448,391 | 8/1948 | Pyle | 260—82.1 |
| 3,240,841 | 3/1966 | Hsieh | 260—94.7 |

OTHER REFERENCES

Chemical Abstracts, volume 51, column 9199 C-G.

MORRIS LIEBMAN, *Primary Examiner.*

S. L. FOX, *Assistant Examiner.*